United States Patent [19]
Beauvoir

[11] Patent Number: 6,059,482
[45] Date of Patent: May 9, 2000

[54] BOLTED CONNECTOR FOR CONNECTING BEAMS TO COLUMNS

[75] Inventor: Charles Henri Beauvoir, San Francisco, Calif.

[73] Assignee: ICF Kaiser Engineering, Inc., Fairfax, Va.

[21] Appl. No.: 08/787,221

[22] Filed: Jan. 22, 1997

[51] Int. Cl.$^7$ .................................................. B25G 3/00
[52] U.S. Cl. ...................... 403/262; 403/405.1; 403/187; 52/714; 52/236.6; 52/655.1
[58] Field of Search .................... 52/714, 236.6, 52/236.7, 236.9, 656.9, 655.1; 403/406.1, 189, 187, 231, 405.1, 262, 407.1, 256, 258, 260, 217, 218, 170, 174, 178

[56] References Cited

U.S. PATENT DOCUMENTS

| | | |
|---|---|---|
| 471,610 | 3/1892 | Hart . |
| 508,280 | 11/1893 | Cavallaro . |
| 1,899,799 | 2/1933 | Edwards . |
| 2,146,333 | 2/1939 | Deming . |
| 2,456,055 | 12/1948 | Farrar . |
| 3,194,527 | 7/1965 | Gruss . |
| 3,674,289 | 7/1972 | Geraci . |
| 3,816,011 | 6/1974 | Biebuyck et al. ................. 403/260 X |
| 3,938,297 | 2/1976 | Sato et al. . |
| 3,945,741 | 3/1976 | Wendt . |
| 3,960,458 | 6/1976 | Sato et al. . |
| 4,014,089 | 3/1977 | Sato et al. . |
| 4,068,964 | 1/1978 | Stoker . |
| 4,074,947 | 2/1978 | Matake et al. . |
| 4,111,578 | 9/1978 | Sato et al. . |
| 4,220,419 | 9/1980 | Hawes . |
| 4,347,015 | 8/1982 | Olashaw . |
| 4,893,961 | 1/1990 | O'Sullivan et al. . |
| 4,905,436 | 3/1990 | Matsuo et al. . |
| 5,020,678 | 6/1991 | Klein . |
| 5,242,239 | 9/1993 | Hosokawa ........................... 403/260 X |
| 5,660,017 | 8/1997 | Houghton ............................... 52/655.1 |

FOREIGN PATENT DOCUMENTS

| | | |
|---|---|---|
| 29 40 030 | 4/1981 | Germany . |
| 2 132 073 | 7/1984 | United Kingdom . |

*Primary Examiner*—Terry Lee Melius
*Assistant Examiner*—William L. Miller
*Attorney, Agent, or Firm*—Burns Doane Swecker & Mathis LLP

[57] ABSTRACT

A bolted connector includes a bulk head for connection to a column and a plate extending from the bulk head for connection to a beam. The bolted connector is preferably die cast for ease of manufacturing to avoid welded connections which may provide structural weaknesses. The bulk head has a compact tapered shape which provides a reduced surface area end surface coming into contact with the column. This reduced contact area of the end surface provides an advantageous configuration which avoids the prying action of the prior art T-shaped brackets. The plate which extends from the bulk head includes a plurality of bores for attaching the plate to the flange of a beam. The plate has a first thickness at a portion of the plate which is adjacent the bulk head and a second smaller thickness at a portion of the plate furthest from the bulk head. The variation in thickness of the plate allows the strength of the connector to be tuned to the amount of stress which the plate will be subjected to at any particular location.

24 Claims, 5 Drawing Sheets

BOLTED CONNECTOR FOR CONNECTING BEAMS TO COLUMNS

BACKGROUND OF THE INVENTION

1. Field of the Invention

The present invention relates to a bolted connector for steel frame structures and more particularly, to a die cast bolted connector for use in steel frame structures to effect a bolted connection between a beam and a column.

2. Description of the Related Art

Steel frame structures such as buildings and the like are typically constructed either with welded connections or bolted fittings between beams and columns to achieve an assembly capable of bracing structures against lateral loads, such as earthquakes, wind, etc.

While welded connections are typically satisfactory under most normal loading conditions, these connections may be inadequate when the structure is subjected to abnormal loading conditions such as those that occur during earthquakes or other catastrophic events. The high loading forces experienced by structures during earthquakes are often sufficient to fracture or otherwise damage a welded connection. Thus, the welded connections tend to be the point of structural failure in welded steel frame structures.

Both the known welded and known bolted connections attempt to protect the columns and joints while promoting failure in the beams rather than at the joints. This practice has resulted in solutions which reduce the economy of the steel frame system. The known connections promote hinging/failure in the beam several feet away from the center of the column. Because this hinging occurs several feet from the center of the column, it magnifies the forces experienced by the column (from secondary moments/forces) thus increasing the size columns needed and thereby decreasing the economy of the structural steel frame assembly.

The column size may typically need to be further increased over and a earthquake force requirements to maintain superior strength over the beam which must remain the weak link. Because the structural steel yield and ultimate strengths of the beams can vary greatly due to structural steel milling practices and availability of raw material, maintaining column superior strength over the beams must be realized by using the worst case upper limit of the strength of the beams. For example, 50 ksi minimum yield steel may actually be 65 ksi yield. This increases column sizes which further reduces the economy of these known structures.

In addition, because the known structures promote failure of the beam, the cost of repairing the beams becomes a considerable expense due to the size of the beams, the lack of adequate access to the beams once the structure has been enclosed by finishes, and the need to weld near combustible materials. This reduces further the economy of the systems which promote hinging/failure of the beam.

An alternative to welded connections is a semi-rigid connection employing a bolted fitting. One type of bolted fitting for connecting columns and beams which has been used in place of a welded connection employs a T-shaped fitting to provide a bolted connection between the beam and the column. This type of T-shaped connection includes a base plate (top of T) which is bolted to the column and a protrusion which is bolted to the flange of an I-beam by high strength bolts. In connecting a beam to a column, two T-shaped fittings are generally attached by the protrusion to the top and bottom flanges of the I-beam. The base plate of the T-shaped fitting is attached by bolts to the column. However, the bolts which connect the base plate of the fitting to the column may tend to experience a lever effect when the flange of the beam to which the protrusion is bolted is subjected to a tensile force. This lever effect or prying action places a high stress on the bolts. Therefore, various attempts have been made to strengthen these bolted connections. The fittings themselves have been strengthened to such a degree that structures employing these types of fittings tend to have failures which occur in the beams at the location where the connectors end several feet from the center of the column.

T-shaped fittings are illustrated in U.S. Pat. Nos. 3,960,458, 3,938,297, 4,014,089, and 4,074,947.

SUMMARY OF THE INVENTION

The device according to the present invention addresses the disadvantages of the prior art by providing a "fused" rigid frame construction in which a bolted connector for connecting columns and beams is particularly adapted to prevent failure of the columns and beams by providing a gradual yielding of the connector which acts as a "fuse". The connector also eliminates the lever effect (prying action) of known bolted connectors thus reducing the size of the bolts required to connect the device to the column.

The device also eliminates the need to increase column sizes over the and above earthquake design forces to maintain a weak beam, and also shifts the hinging/failure point closer to the column than the known systems thus reducing the demand from secondary moments on the column, the associated size increase of the column, and the resulting decrease in economy.

The device also provides an improvement in repair economy by promoting the failure of the connector instead of the beam. Thus, an element of much smaller size needs to be repaired or replaced, and welding near combustible materials is also not required.

According to one aspect of the invention, a bolted connector for connecting beams to columns includes a bulk head having a first surface for abutting a column and a second surface opposite to the first surface, the bulk head tapering from the second surface to the first surface, four bores extending through the bulk head from the first surface to the second surface for receiving bolts to connect the bulk head to a column, and a plate extending from the second surface of the bulk head such that two of the four bores are located on one side of the plate and the other two bores are located on an opposite side of the plate, the plate including a series of through bores for receiving bolts to connect the plate to a beam, and the plate having a first thickness at a first end and having a second thickness smaller than the first thickness at a second end.

According to another aspect of the invention, a bolted connector for connecting beams to columns includes a bulk head having a first surface for abutting a column and a second surface opposite to the first surface, the bulk head tapering from the second surface to the first surface, a plurality of bores extending through the bulk head from the first surface to the second surface for receiving bolts to connect the bulk head to the column, and a plate extending from the second surface of the bulk head, the plate including a plurality of bores for receiving bolts to connect the plate to a beam.

According to a further aspect of the invention, a bolted connection system includes at least one bolted connector for connecting a beam to a column including a bulk head having a first surface for abutting the column and a second surface opposite to the first surface, the bulk head tapering from the second surface to the first surface, a plurality of bores extending through the bulk head from the first surface to the second surface for receiving bolts to connect the bulk head to the column, and a plate extending from the bulk head, the plate including a plurality of bores for receiving bolts to connect the plate to a beam, and a plate shaped connector having at least four edges and at least one bolt receiving bracket formed at one of the at least four edges of the plate shape connector for connecting to the bulk head of an associated bolted connectors.

BRIEF DESCRIPTION OF THE DRAWINGS FIGURES

The invention will be described in greater detail with reference to the accompanying drawings in which like elements bear like reference numerals, and wherein.

DETAILED DESCRIPTION OF THE INVENTION

Figure 1:
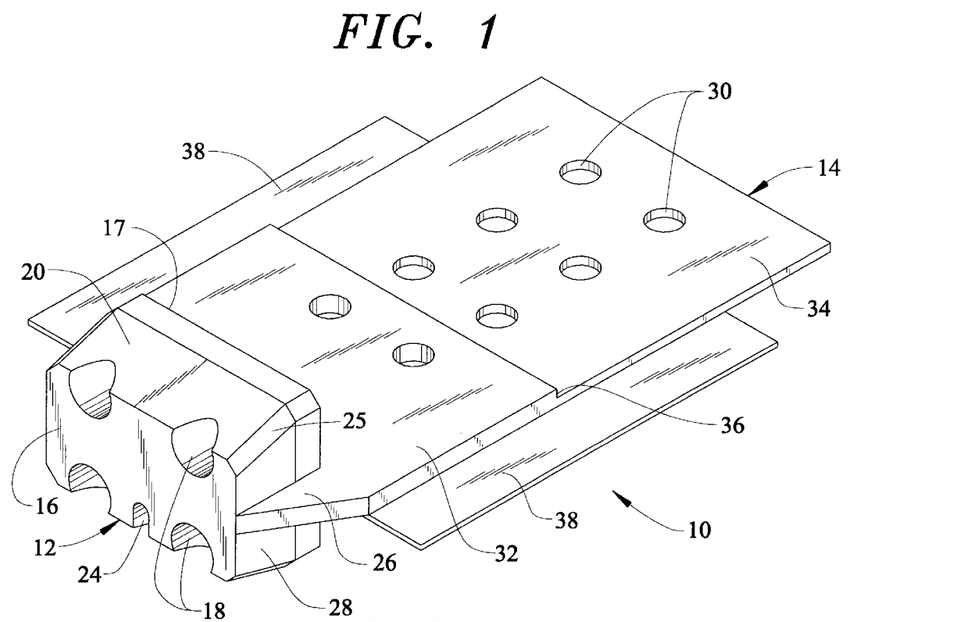
FIG. 1 is a perspective view of the bolted connector according to the present invention.
Figure 2:
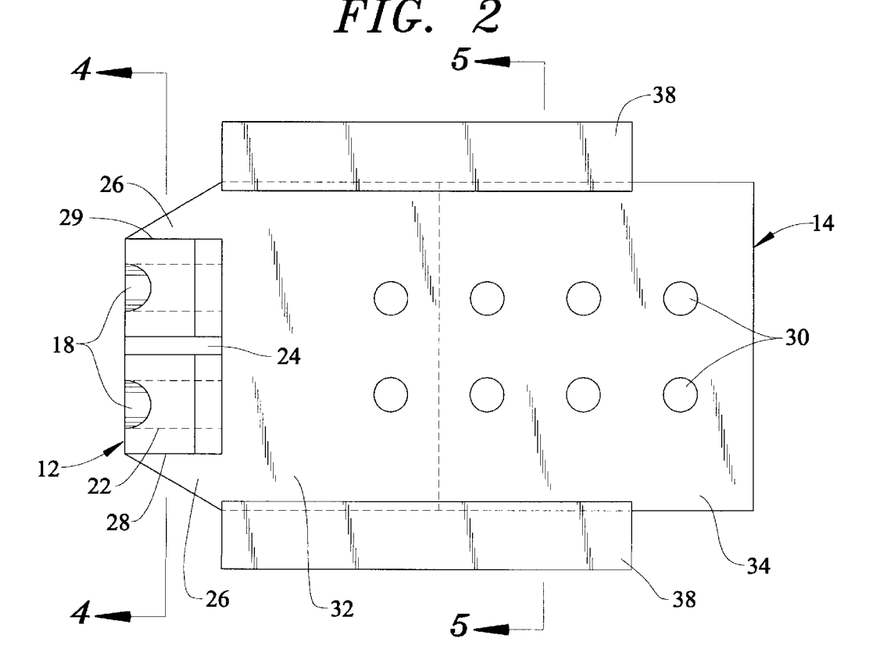
FIG. 2 is a bottom view of the bolted connector of FIG. 1.

The bolted connector 10 according to the present invention includes a bulk head 12 for connection to a column and a plate 14 extending from the bulk head for connection to a beam. The bolted connector is preferably die cast for ease of manufacturing and to avoid welded connections which may provide structural weaknesses. The bulk head 12 has a compact tapered shape which reduces the surface area at the end surface 16 of the bulk head which comes into contact with the column. This reduced contact area of the end surface 16 provides an advantageous configuration which avoids the prying action of the prior art T-shaped brackets. The tapered shape of the bulk head 12 also requires less steel and thus provides a cost advantage over larger connectors. The tapered shape of the bulk head 12 is provided by an angled top surface 20 and an angled bottom surface 22 of the bulk head. The two end surfaces 16 and 17 of differing sizes are preferably parallel.

The bulk head 12 includes a series of bores 18 for receiving bolts. The bores 18 are positioned symmetrically above and below the plate 14, and extend from one end surface 16 of the bulk head to the opposite end surface 17 of the bulk head. The bores 18 preferably intersect the angled top and bottom surfaces 20, 22 of the bulk head 12. The diameter of the bulk head bores 18 will depend on the loads experienced by the structure and the size of the bolts required to accommodate the expected loads. The bores 18 may be, for example, 2 inch bores positioned 2 to 5 inches apart along the width of the bulk head and 1 to 3 inches apart along the height of the bulk head. This relatively close and symmetrical spacing of the bores 18 and the thickness of the bulk head between the end surfaces 16, 17 helps prevent the prying effect which occurs in the types of connectors mentioned above.

The bulk head includes side surfaces 28, 29 which are substantially parallel to each other and perpendicular to the two end surfaces 16, 17. Alternatively, the side surfaces 28, 29 may be angled in a manner similar to the top and bottom surfaces 20, 22. By additionally tapering the side surfaces 28, 29, it is possible to further reduce the area of the end surface 16 which contacts the column. Tapered side surfaces 28, 29 will further reduce the amount of material used. The bulk head may also include corner bevels 25 which also reduces the amount of material used.

Figure 4:
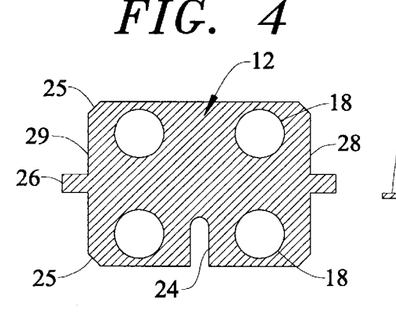
FIG. 4 is a sectional view of the bolted connector taken along line 4—4 of FIG. 2.
Figure 5:
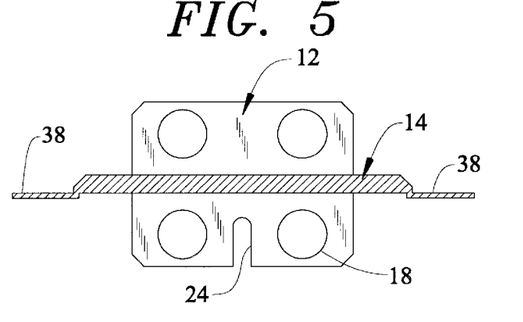
FIG. 5 is a sectional view of the bolted connector taken along line 5—5 of FIG. 2.

A groove 24 is provided in the lower surface 22 of the bulk head 12. This groove 24 is sized to accommodate the web of an I-beam when the plate 14 is attached to the flange of the I-beam. This groove 24 reduces the material of the beam web that must be cut away to attach the bolted connector 10 to the beam. According to the present invention, the groove 24 has a width which depends on the web width, and which allows the bulk head to fit easily over the web. For example, the groove 24 may have a width of approximately 1.5 inches. The groove 24 preferably has a rounded bottom in cross section as shown in FIGS. 4 and 5. The formation of the groove 24 removes additional material and thus, further reduces the weight of the bracket.

The plate 14 extends from the bulk head 12 along a central plane of the larger of the two end surfaces 17 of the bulk head. Since the bolted connector 10 is die cast, the bulk head 12 and the plate 14 are formed integrally in one piece, at the same time, and have no structurally weak joint areas.

The plate 14 has a width which is larger than the width of the bulk head 12. The plate 14 includes two triangular portions 26 which adjoin the side surfaces 28, 29 of the bulk head 12. The triangular portions 26 provide further structural support for the plate 14. The plate 14 is provided with two rows of bores 30 for attaching the plate to the flange of a beam with a plurality of bolts.

Figure 3:
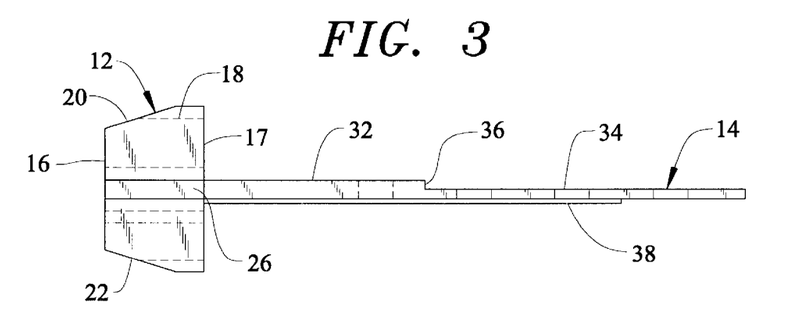
FIG. 3 is a side view of the bolted connector of FIG. 1.

As shown in FIGS. 1 and 3, the plate 14 includes a first portion 32 adjacent the bulk head 12 and having a first thickness, and a second portion 34 remote from the bulkhead 12 and having a second thickness which is smaller than the first thickness. This difference in thickness along the length of the plate 14 is provided due to the fact that the load on the bolted connector 10 decreases at greater distances from the column.

As shown in FIGS. 1 and 3, the change in thickness of the plate 14 may be accomplished by a single step 36 located between a first pair of bores located closest to the bulkhead 12 and the adjacently positioned second pair of bores 30. Alternatively, the step 36 may be formed between other pairs of bores 30 or successive steps may be provided between successive pairs of bores. The reduction in thickness may also be a gradual reduction in thickness without the use of steps. The reduction in thickness of the plate 14 serves at least two purposes.

The magnitude of the stress exerted on the plate 14 decreases as the distance from the bulk head increases. Thus, the reduction in thickness of the plate 14 tends to tune the strength of the plate to the amount of stress which the plate will be subjected to at any particular location. This is beneficial as it leads to structural yielding in a gradual manner rather than catastrophic yielding of the structure. Second, the reduction in thickness reduces the total amount of material used and thus, the total weight and cost of the connector.

As an example, the bolted connector 10 can be tuned to achieve yields comparable to A36 steel beams (Fy=36 ksi minimum) when used in combination with A572 steel (Fy= 50 ksi) beams and columns. The advantage in this case is that the structure can be designed as a rigid frame with equivalent A36 beam properties and also have the beams and columns protected by the connector which acts as a "fuse".

The thickness of the bulk head 12 according to the present invention between the two end surfaces 16, 17 is preferably quite large as compared to the prior art fittings. For example, the ratio of the thickness of the bulk head 12 to a critical height of the bulk head, measured from the center of plate 32 to the center of the bore holes 18, is between 1:1 and 1:3, preferably 1:2. By way of example, the critical height may be 2 inches while the thickness of the bulkhead between the two end surfaces 16, 17 may be 4 inches. These dimensions may, of course, vary depending upon the particular loading conditions.

By way of example, the first portion 32 of the plate may have a thickness of 0.5 to 2.5 inches, preferably approximately the thickness of the beam flange, while the second portion 34 of the plate may have a thickness slightly less than the first portion 32, depending upon the stress conditions experienced by the second portion 34. These dimensions may, of course, vary depending upon the particular loading conditions.

According to the present invention, the plate 14 preferably includes fins 38 which provide a support surface for a deck floor or roof. The fins 38 preferably have a thickness which is smaller than the thickness of the plate 14 and extend from the lower surface of plate 14 as shown in FIG. 5. The two fins 38 lie in a common plane with their surface in the same plane as the bottom surface of the plate 14. The two fins 38 are also disposed along opposite sides of the plate 14. The use of the connector according to the present invention including the fins 38 allows a single element to perform both functions of connecting beams to columns and supporting a deck floor or roof on a beam.

Figure 6:
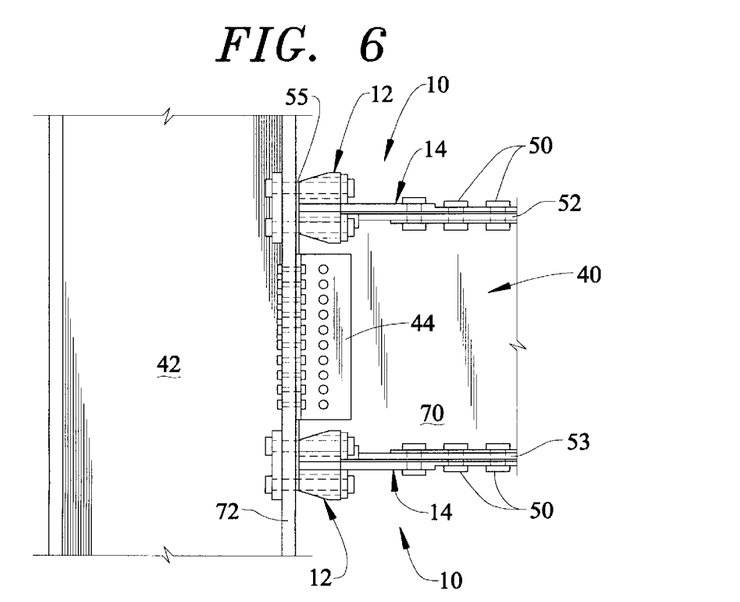
FIG. 6 is a side view of a column and-a beam connected by a bolted connector according to the present invention.
Figure 7:
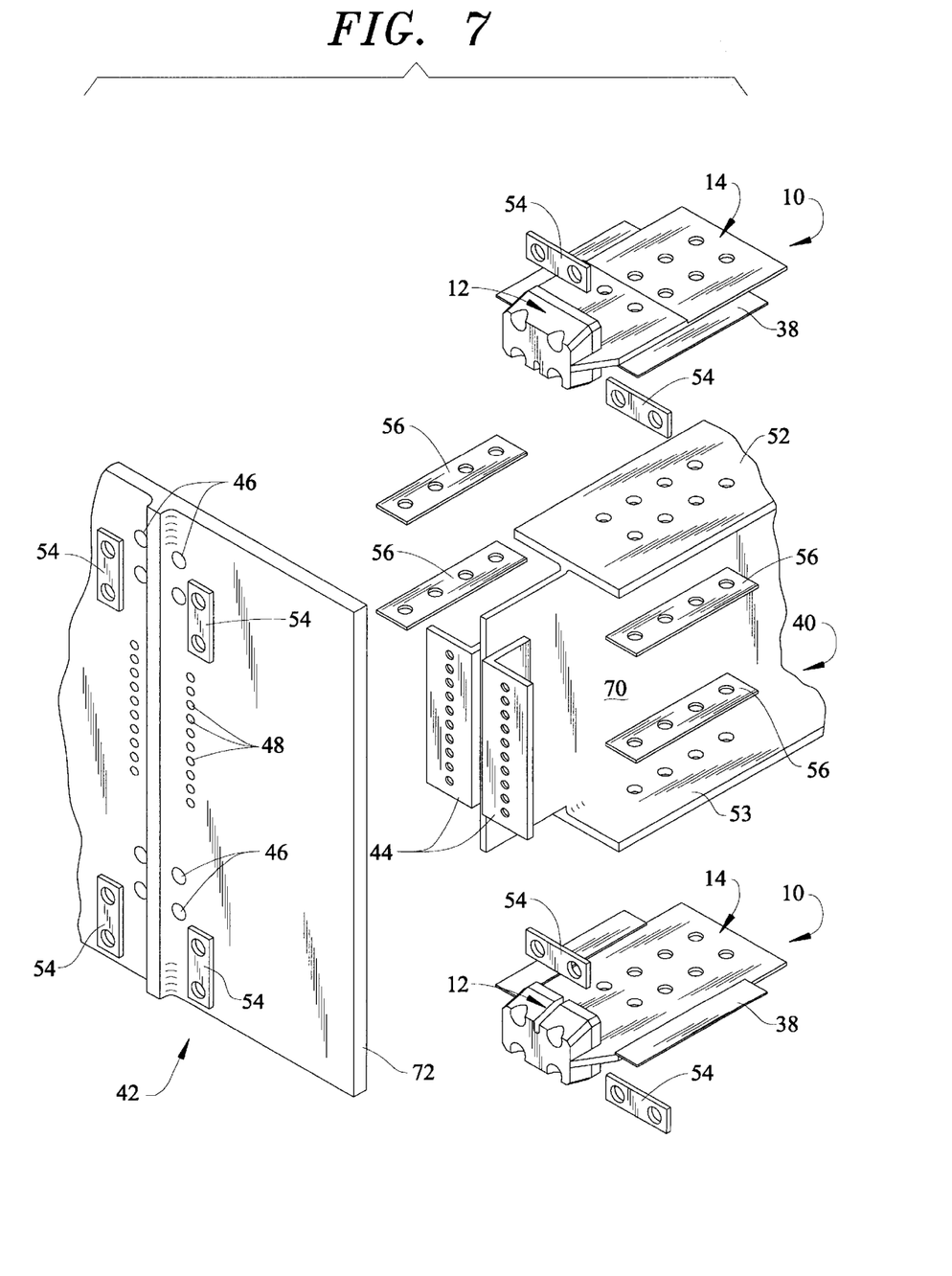
FIG. 7 is an exploded view of the connection of FIG. 6.

The connection of a beam 40 to a column 42 is illustrated in FIGS. 6 and 7. When the bolted connector 10 is placed on the flange 52 of a beam and then bolted in place, the bottom surface of the plate 14 rests on the beam flanges 52, 53 and the fins 38 extend beyond the sides of the beam to provide a support surface extending from the beam on which a deck floor or roof is supported. In addition to the function of supporting a deck floor or roof, the fins 38 also provide reinforcement and strengthening of the plate 14 to prevent buckling from compression stresses, particularly in the area between the bulk head 12 and the first set of holes 30. Because the deck floor or roof is usually supported on the top flange of the beam, the top of fin 38 should be in the same plane as the top plane of the beam when the bolted connector 10 is mounted on the beam. Thus, the deck floor or roof may be supported on the fins 38 and/or the top of the beam which are provided at the same level to support the deck.

FIG. 6 illustrates the connection of a beam 40 to a column 42 with two bolted connectors 10 according to the present invention, and a conventional clip angle 44. FIG. 7 is an exploded view of the connection assembly of FIG. 6. As seen in FIG. 7, portions of the top and bottom flanges 52, 53 of the beam 40 which are closest to the column are cut away to accommodate the bolted connectors 10. The plates 14 of the bolted connectors 10 are bolted to the flanges 52, 53 of the beam by bolts 50. When the connection between the beam 40 and column 42 is completed, a space 55 is provided between the bulk head 12 of the bolted connector 10 and the flange 72 of the column 42 to which the beam is attached. This space 55 allows for construction tolerance and is shimmed. The web 70 of the beam 40 is preferably also attached to the flange 72 of the column by the pair of clip angles 44 which provide vertical/shear structural support for the connection but no flexural support. To ensure that the clip angles 44 will only support vertical/shear loads, bolt holes are provided in the clip angles for attachment to the beam web which are slotted horizontally to allow for movement of the bolts.

As illustrated in FIG. 7 the flange 72 of the column 42 is provided with two sets of four bores 46 for attachment of the bulk heads 12 of the bolted connectors 10, and two rows of smaller bores 48 for attachment of the clip angles 44.

The bolted connectors 10 are provided with support plates 54 received on opposite sides of the bulk head bolted connections. In addition, support plates 56 are preferably received on the inside surfaces of the top and bottom flanges 52, 53 of the beam 40 for connection of the plates 14 to the beam. The support plates 54, 56 prevent the flanges of the beam 52, 53 from buckling and may also be desirable between the bulkhead and the first set of bolts to the beam to prevent buckling of plate 32.

Although the bolted connector 10 is illustrated as connected to the flange 72 of the column 42, the beam may also be attached to the column in an orientation which is perpendicular to the orientation shown in FIGS. 6 and 7. In this alternative orientation, the bolted connector 10 is attached to the web of the column between the flanges. The beam 40 may also be attached to the column 42 at an angle by angling the end surface 16 of the connector 10.

Figure 8:
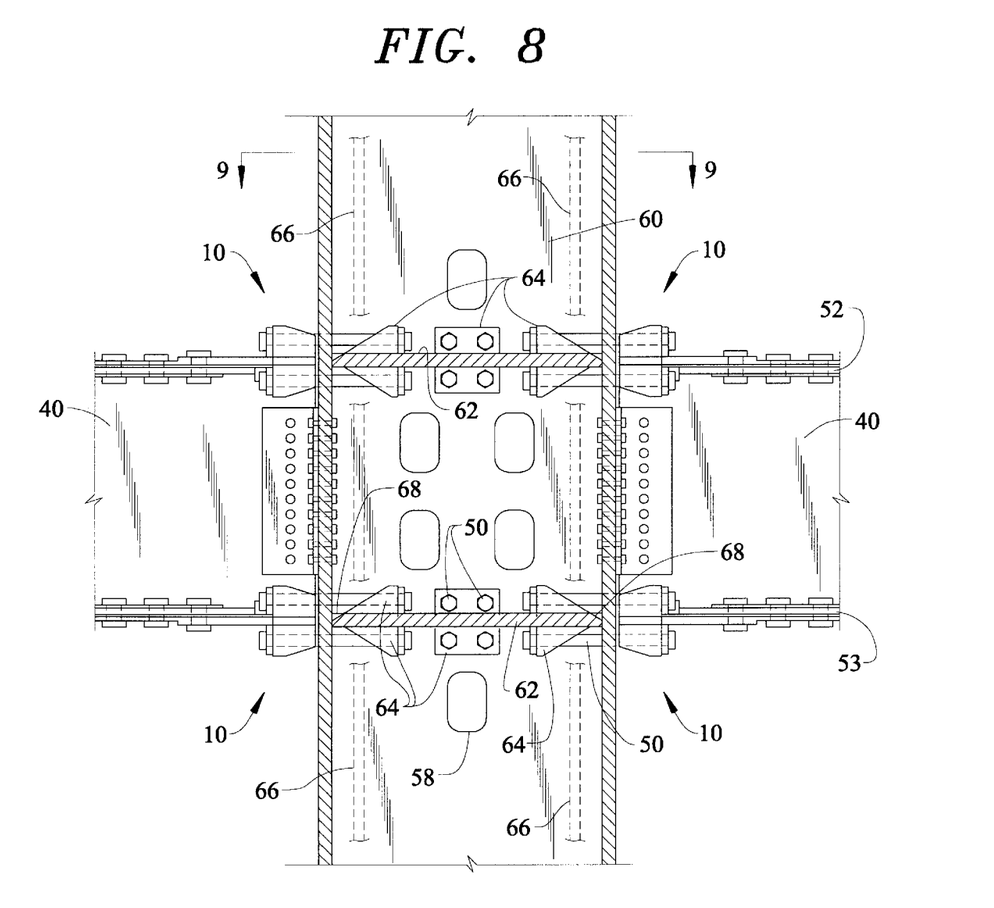
FIG. 8 is a cross sectional view of a box column which is connected to a beam at each side by bolted connectors according to the present invention.
Figure 9:
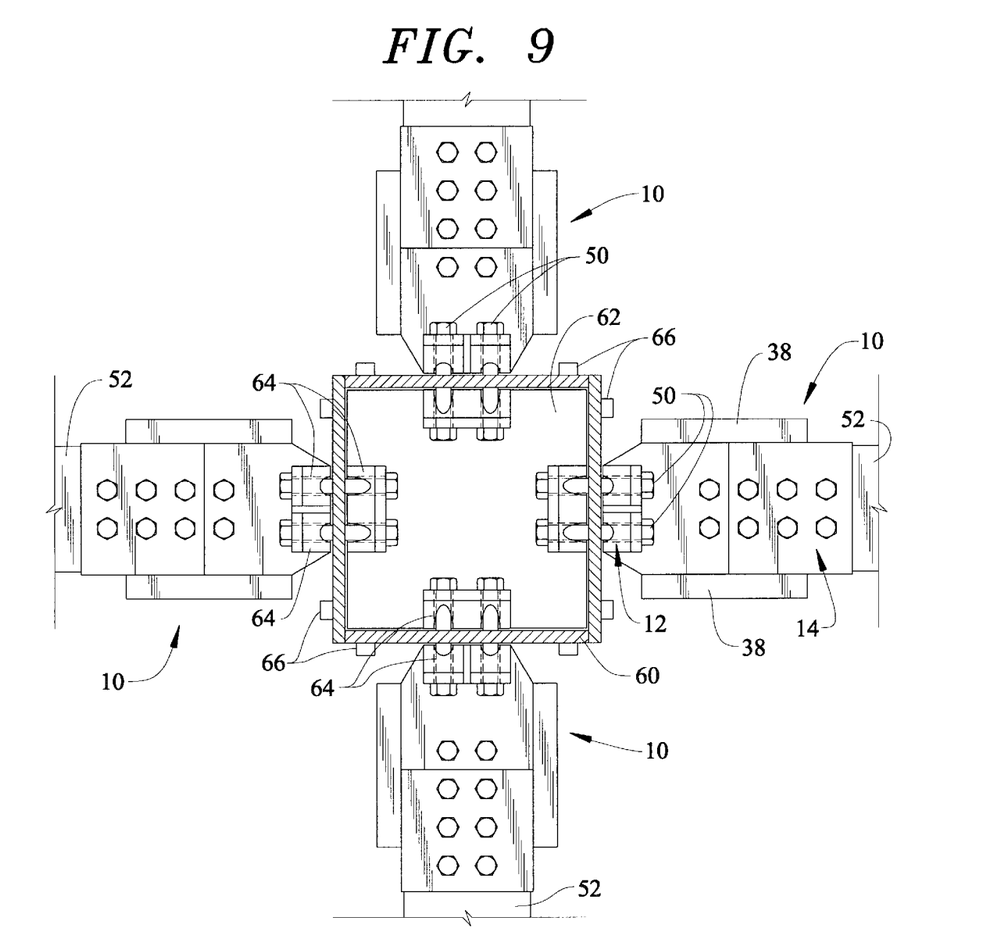
FIG. 9 is a top cross sectional view of the box column, bolted connector brackets, and beams of FIG. 8.

The bolted connector 10 according to the present invention may also be used to connect up to four beams 40 to a box column 60, as shown in FIGS. 8 and 9 or to connect a multitude of beams to column shapes which allow more than four beams to connect to the column. FIG. 8 illustrates a vertical cross section through a box column 60, while FIG. 9 illustrates a top cross-sectional view taken along line 9—9 of FIG. 8. A pair of bolted connectors 10, such as the connector illustrated in FIGS. 1–5, is used at an exterior of the box column 60 to attach each of the beams 40 to the box column at the top and bottom flanges 52, 53 of each of the beams. Two additional plate shaped connectors 62 are provided on the interior of the box column 60 for attachment to the bolted connectors 10. According to this embodiment, access holes 58 are provided in the box column 60 to allow access to the interior of the column for installation. The box column 60 is also preferably provided with reinforcing plates 66 which are formed on the exterior of the column to offset the material loss caused by the access holes 58.

The plate shaped connectors 62 have a substantially rectangular shape or will take the shape of the particular column (e.g. circular, hexagon, etc.) when viewed from the top as shown in FIG. 9 and fit inside the box column 60 with a small amount of play or clearance between the plate shaped connector 62 and the interior surfaces on the sides of the column. The thickness of plate 62 varies depending on stress requirements and may have stiffener plates or ribs 67 projecting perpendicular to its plane to control buckling. For the box column configuration, four bolt receiving brackets 64 are attached to the top surface of each plate shaped connector 62, and four bolt receiving brackets 64 are attached to the lower surface of each plate shaped connector 62. Each of the bolt receiving brackets 64 has two bores 74 for receiving the bolts 50. The bolt receiving brackets 64 preferably have a tapered shape which tapers from a largest dimension farthest from the edge of the plate to a smallest dimension at the edge of the plate.

The plate shaped connectors 62 are preferably formed in the same manner as the bolted connectors 10, that is by die casting. The plate shaped connectors are preferably welded by a partial penetration weld 68 at a location where the bolt receiving brackets 64 meet the walls of the box column 60. These welds 68 will help to secure the plate shaped connectors 62 in position and serve to transfer shear forces from column to beam.

As noted above, the bolted connector 10 according to the present invention is die cast which avoids any joints which would provide structurally weak areas in the connector construction. The particular configuration and dimensions of the bolted connector 10 are preferably designed so that the strength of the connector is tuned to a particular application. The bolted connector 10 may be tuned to prevent sudden failures by configuring the connector to yield in a gradual manner. The tuning of the bolted connector 10 may be performed by varying the thickness, width, and length of the plate 14, and/or by varying the size and thickness of the fins 38.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bolted connector for connecting beams to columns comprising:
   a bulk head having a first surface for abutting a column and a second surface opposite to the first surface, the bulk head tapering from the second surface to the first surface, four bores extending through the bulk head from the first surface to the second surface for receiving bolts to connect the bulk head to the column; and
   a plate extending from the second surface of the bulk head such that two of the four bores are located on one side of the plate and the other two bores are located on an opposite side of the plate, the plate including a series of through bores for receiving bolts to connect the plate to a beam, and the plate having a first thickness at a first end and having a second thickness smaller than the first thickness at a second end, at least one of the through bores for connecting the plate to the beam extending through the first thickness and at least a second of the through bores for connecting the plate to the beam extending through the second thickness.

2. The bolted connector according to claim 1, wherein the bulk head includes an angled top surface and an angled bottom surface and each of the four bores intersect one of the angled top surface and the angled bottom surface.

3. The bolted connector according to claim 1, wherein the plate has a width in a first direction which is larger than a width of the bulk head in the first direction.

4. The bolted connector according to claim 1, wherein the bulk head includes side surfaces, and the plate includes two triangular portions which adjoin the side surfaces of the bulk head.

5. The bolted connector according to claim 1, further comprising deck floor supports extending from opposite sides of the plate.

6. The bolted connector according to claim 5, wherein the deck floor supports are elongated plates which are located in a plane which is displaced from a plane extending through the plate, and are adapted to extend beyond the flange of a beam on which the plate is positioned.

7. The bolted connector according to claim 1, wherein the bulk head includes a groove formed in one side of the bulk head and extending from the first surface to the second surface for receiving a portion of the web of a beam.

8. The bolted connector according to claim 1, wherein a ratio of a thickness of the bulk head between the first and second surfaces at a location of one of the four bores to a critical height of the bulk head measured from a center of the plate to a center of the bores is between 1:1 and 1:3.

9. The bolted connector according to claim 1, wherein a stepped surface is formed on a first side of the plate between the first portion of the plate having the first thickness and the second portion of the plate having the second thickness.

10. A bolted connector for connecting beams to columns comprising:
    a bulk head having a first surface for abutting a column and a second surface opposite to the first surface, the entire second surface being parallel to the first surface, the bulk head tapering from a first dimension of the second surface to a second dimension of the first surface, the first dimension being larger than the second dimension, a plurality of bores extending through the bulk head from the first surface to the second surface for receiving bolts to connect the bulk head to the column; and
    a plate extending from the second surface of the bulk head and having a longitudinal axis, the plate including a plurality of bores for receiving bolts to connect the plate to a beam, wherein the first dimension and the second dimension are located in a plane which is substantially perpendicular to the longitudinal axis of the plate.

11. The bolted connector according to claim 10, wherein the plate extends from a substantially central portion of the bulk head such that the plate is positioned between the plurality of bores.

12. The bolted connector according to claim 10, wherein a first portion of the plate adjacent the bulk head has a first thickness and a second portion of the plate has a second thickness which is smaller than the first thickness.

13. The bolted connector according to claim 10, wherein the first and second surfaces of the bulk head are parallel.

14. The bolted connector according to claim 10, wherein the bulk head includes an angled top surface and an angled bottom surface and the plurality bores each intersect one of the angled top surface and the angled bottom surface.

15. The bolted connector according to claim 10, wherein the bulk head includes side surfaces substantially perpendicular to the first and second surfaces, and the plate includes two triangular portions which adjoin the side surfaces of the bulk head.

16. The bolted connector according to claim 10, further comprising deck floor supports extending from opposite sides of the plate.

17. The bolted connector according to claim 10, wherein the bulk head includes a groove formed in one side of the bulk head and extending from the first surface to the second surface which is adapted for receiving the portion of a web of a beam.

18. A bolted connection system comprising:

at least one bolted connector for connecting a beam to a column including a bulk head having a first surface for abutting the column and a second surface opposite to the first surface, the entire second surface being parallel to the first surface, the bulk head tapering from a first dimension of the second surface to a second dimension of the first surface, the first dimension being larger than the second dimension, a plurality of bores extending through the bulk head from the first surface to the second surface for receiving bolts to connect the bulk head to the column, and a plate extending from the bulk head and having a longitudinal axis, the plate including a plurality of bores for receiving bolts to connect the plate to the beam wherein the first dimension and the second dimension are located in a plane which is substantially perpendicular to the longitudinal axis of the plate; and a plate shaped connector having at least four edges and at least one bolt receiving bracket formed at one of the at least four edges of the plate shape connector for connecting to the bulk head of the at least one bolted connector.

19. The bolted connection system according to claim 18, wherein the at least one receiving bracket of the plate shaped connector is formed at a center portion of one of the at least four edges of the plate shaped connector, and the receiving bracket tapers from a largest dimension at a location furthest from the edge of the plate shaped connector to a smallest dimension near the edge of the plate shaped connector.

20. The bolted connection system according to claim 18, wherein a plurality of bolt receiving brackets are provided in pairs which are positioned opposite each other on a top and bottom of the plate shaped connector.

21. A bolted connector for connecting beams to columns comprising:

a bulk head having a first surface for abutting a column and a second surface opposite to the first surface, a plurality of bores extending through the bulk head from the first surface to the second surface for receiving bolts to connect the bulk head to the column;

a plate extending from the second surface of the bulk head, the plate including a plurality of bores for receiving bolts to connect the plate to a beam; and two deck floor supports extending from opposite sides of the plate, wherein the two deck floor supports are elongated plates which are located in a plane which is parallel to and displaced from a plane extending through the plate, and are adapted to extend beyond a flange of the beam on which the plate is positioned.

22. A structural system comprising:

a structural column;

a structural beam having a web; and a bolted connector comprising:

a bulk head having a first surface for abutting the column and a second surface opposite to the first surface, a plurality of bores extending through the bulk head from the first surface to the second surface for receiving bolts to connect the bulk head to the column, the bulk head having a groove formed in one side of the bulk head and extending from the first surface to the second surface which receives a portion of the web of the beam; and a plate extending from the second surface of the bulk head, the plate including the plurality of bores for receiving bolts to connect the plate to the beam.

23. A bolted connector for connecting beams to columns comprising:

a bulkhead having a first surface for abutting a column and a second surface opposite to the first surface, a plurality of bores extending through the bulkhead from the first surface to the second surface for receiving bolts to connect the bulkhead to the column; and a plate integral with and extending from the second surface of the bulkhead, the plate including a plurality of bores for receiving bolts to connect the plate to a beam, the bulkhead having a thickness measured from the first surface to the second surface at a location of one of the plurality of bores in the bulkhead which is between 1 and 3 times a critical height of the bulkhead measured from a center of the plate to a center of one of the plurality of bores in the bulkhead.

24. The bolted connector according to claim 23, wherein a ratio of the critical height to the thickness of the bulk head is approximately 1:2.

\* \* \* \* \*